United States Patent [19]

Kubic et al.

[11] Patent Number: 5,037,257
[45] Date of Patent: Aug. 6, 1991

[54] WALL PLUG AND ANCHOR ASSEMBLY

[75] Inventors: Nick Kubic, Dollard des Ormeaux; Denis Genois, Cartierville, both of Canada

[73] Assignee: Roll It Inc., Lachine, Canada

[21] Appl. No.: 580,550

[22] Filed: Sep. 11, 1990

[51] Int. Cl.⁵ .................... F16B 13/04; F16B 21/00
[52] U.S. Cl. ........................................ 411/30; 411/39; 411/344; 411/448; 411/922
[58] Field of Search ............... 411/21, 39, 40, 41, 411/45-48, 179, 340-346, 357, 358, 446-448, 922, 449, 29, 30, 42

[56] References Cited

U.S. PATENT DOCUMENTS

| | | | |
|---|---|---|---|
| 172,845 | 10/1916 | Pauley. | |
| 1,133,947 | 3/1915 | Fischer | 411/922 |
| 2,498,627 | 2/1950 | Hallock | 411/449 |
| 2,741,939 | 4/1956 | Hallock | 411/447 |
| 3,240,101 | 3/1966 | Hallock | 411/447 |
| 4,142,440 | 3/1979 | Schefer | 411/42 |
| 4,294,156 | 10/1981 | McSherry et al. | 411/345 |
| 4,637,765 | 1/1987 | Omata | 411/41 |
| 4,650,386 | 3/1987 | McSherry et al. | 411/340 |
| 4,662,808 | 5/1987 | Camilleri | 411/340 |
| 4,844,676 | 7/1989 | Adamek et al. | 411/386 |
| 4,902,179 | 2/1990 | Harker | 411/30 |

FOREIGN PATENT DOCUMENTS 446939 3/1948 Canada.
1137796 12/1982 Canada.

OTHER PUBLICATIONS

Advertising brochure of JTB Inc., entitled "Grip-Tite," 1988.
Advertising brochure of ITW Buildex, entitled "E.Z. Anchor".
Catalogue of Hwally Products Co., Ltd., entitled, "Anchors of all Types".

Primary Examiner—Neill R. Wilson
Attorney, Agent, or Firm—Foley & Lardner

[57] ABSTRACT

Disclosed is an anchor assembly especially for use in a plastic wall-panel which comprises a plug formed of a forward section comprising a tapering plastic board-piercing part and an integral ram head, and of a hollow cylindrical section pivotably connected to the forward section. The assembly may further comprise a spike capable of being driven into the hollow cylindrical section, the spike being provided with a cylindrical portion having serrations on its outer surface for bitting into the cylindrical section or ram head and thus being secured to this section or head. The spike is provided with a hammer portion having a length sufficient at least to engage the ram head, as it is driven into the plug, and to cause pivotal of the forward section of the plug and abutment thereof against the concealed side of the plaster-wall panel.

20 Claims, 5 Drawing Sheets

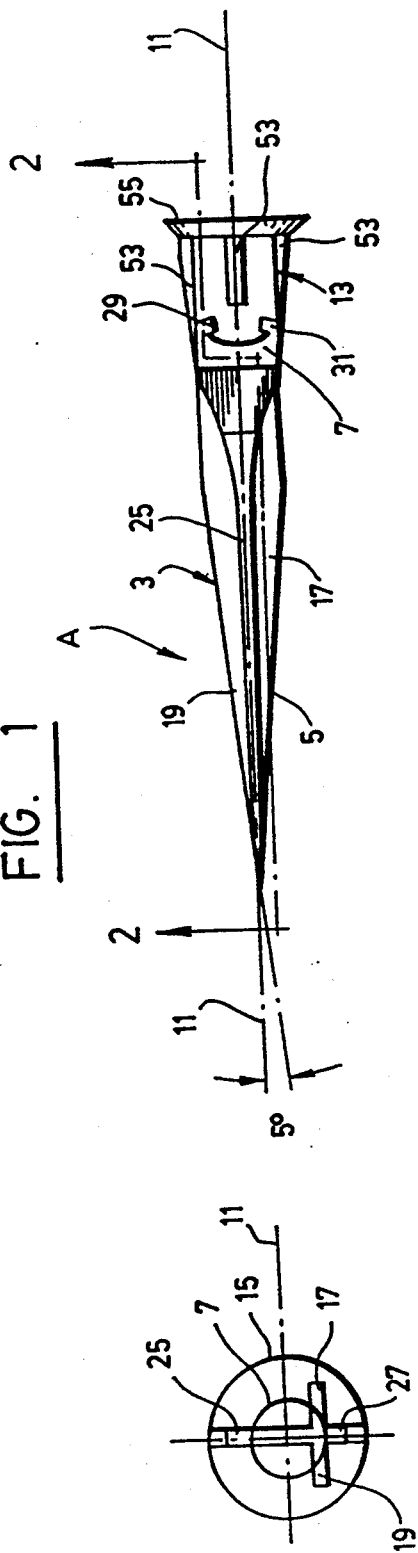
FIG. 1
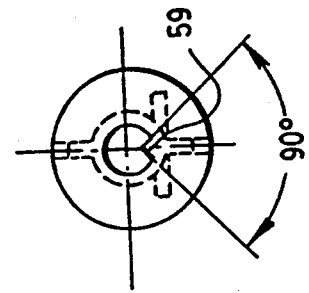
FIG. 4
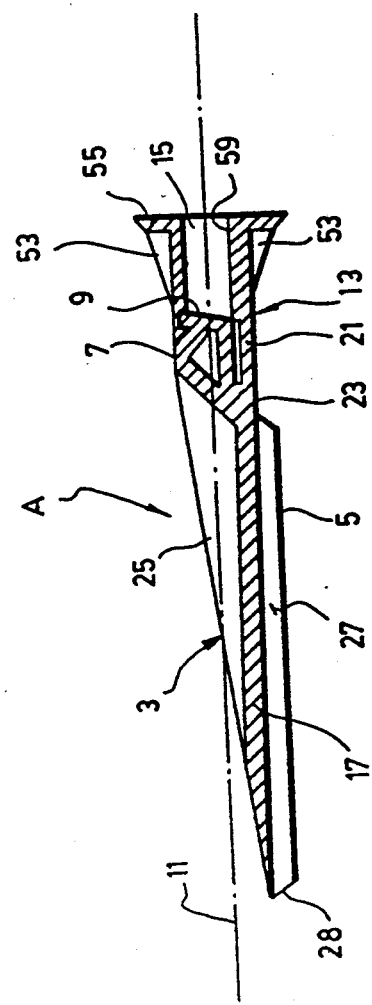
FIG. 2
FIG. 3

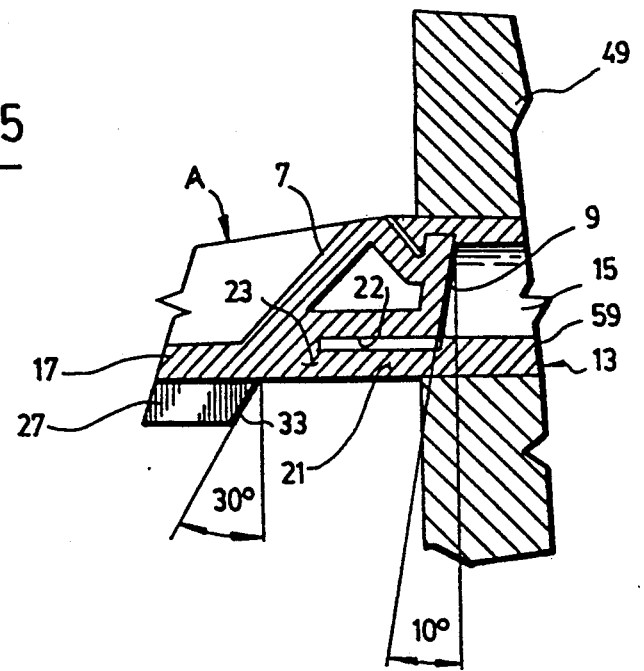
FIG 5
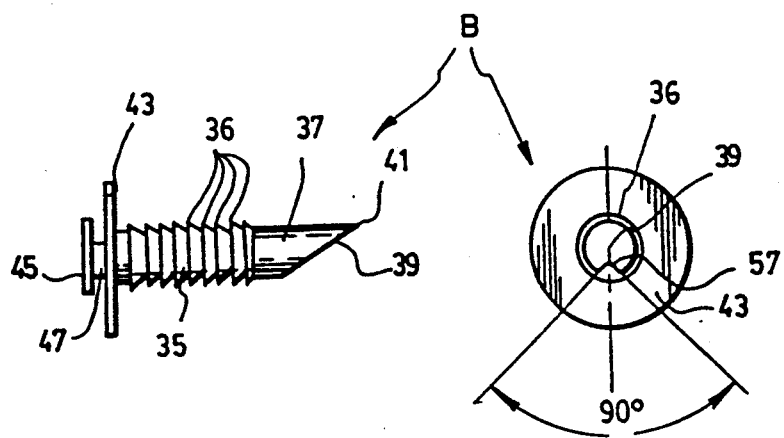
FIG. 6
FIG. 7

5,037,257

WALL PLUG AND ANCHOR ASSEMBLY

BACKGROUND OF THE INVENTION

1. Field of the Invention

The present invention relates to a wall plug and to a wall anchor assembly including the plug, for fastening to a plaster-wall panel, the assembly being intended to support various objects such as framed pictures, paintings, shelvings or the like.

2. Background of the Invention

Various devices of the above type are presently available on the market, all of which necessitate the use of both a hammer and a screw-driver. Examples of such devices are disclosed in Canadian patent Nos. 172,845; 446,939; 1,137,796 and U.S. Pat. Nos. 4,294,156; 4,650,386 and 4,844,676.

Now, while hammers are usually found in all apartments and houses, this is not the case with screw-drivers. Furthermore, not all available known anchor assemblies can be said to hold onto plaster-wall panels adequately, nor are they designed to be easily and safely driven through it. They particularly fail to be provided with appropriate means capable of spreading any loads to be carried by the anchor assembly over a wide area of the concealed face of the panel.

SUMMARY OF THE INVENTION

A main object of the invention is to avoid the above drawbacks by providing a plug and an anchor assembly including this plug, that can easily be mounted on a plaster-wall panel solely by using a hammer.

Another object of the invention is to provide such a plug having a tapering forward section ensuring easy penetration into the plaster of the panel.

Yet another object is to provide a wall plug of the above type, having a taper section connected to a hollow cylindrical section and capable of being pivoted by a spike driven into the cylindrical section by a hammer in a such a manner that the taper section is applied and held against the concealed face of the panel so as to oppose any force tending to pull the plug and spike assembly out of the panel.

Still a further object of the invention is to provide an assembly of the above type, including a releasable lock capable of locking the two sections together, the lock being releasable when the spike is being hammered into the cylindrical section to allow pivotal of the taper section in the above stated manner.

More specifically, the invention first provides a plug formed of a forward section comprising a tapering plaster-wall panel-piercing part and an integral ram head, and of a hollow cylindrical section pivotally connected to a forward section, the two sections being held together by a releasable lock or any other means such as a small integral wall connection capable of being torn out under application of a given pressure.

The invention also provides an assembly comprising a plug as defined hereinabove, in combination with a spike especially sized to be driven into the hollow cylindrical section of the plug. The spike is provided with a cylindrical portion having serrations on its outer surface for bitting into the hollow cylindrical section or into the ram head whereby to be secured to either of them. The spike is further provided with a hammer portion having a length sufficient at least to engage the ram head, as it is driven into the plug, and to cause release of the lock or tearing of the integral connection, and then pivotal of the forward section of the plug and abutment of it against the concealed side of a plaster-wall panel in which the plug was hammered.

Preferably, the spike hammer portion has a bevel-edge defining a sharp tip and, the assembly further comprises means for guiding the spike in the cylindrical section to force engagement of the tip with the ram surface above the pivot connection between the two plug sections.

The plug may preferably include a pair of flat elongated coplanar tapering fins in its tapering part, these fins being disposed on one side of the plug longitudinal axis and being parallel to it. It may also include coplanar straight extensions of the fins, integrally joining the plug cylindrical section to define the connection above-mentioned which allows the pivotal movement between the plug forward and rearward sections.

Further objects and other features of the invention will become apparent from the non-restrictive description that follows of some preferred embodiment of the invention, having reference to the appended drawings.

BRIEF DESCRIPTION OF THE DRAWINGS

FIG. 1 is a top plan view of a plug for an anchor assembly made according to the invention;

FIG. 2 is a cross sectional view of this plug, taken along line II—II of FIG. 1;

FIGS. 3 and 4 are front and rear views, respectively, of the plug of FIGS. 1 and 2;

FIG. 5 is a cross sectional view showing part of FIG. 2, on an enlarged scale;

FIG. 6 is a side elevational view of a spike for use with the plug of FIGS. 1 to 5;

FIG. 7 is a view of one end of the spike shown in FIG. 6;

DESCRIPTION OF THE PREFERRED EMBODIMENTS

Figure 8:
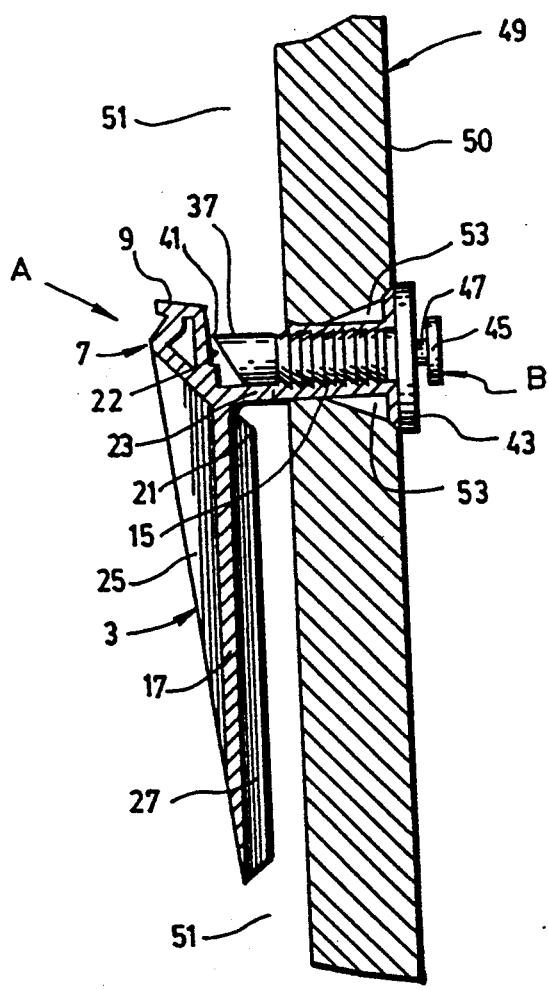
FIG. 8 is a cross-sectional view of an anchor assembly according to the invention, fastened with the spike shown in FIGS. 6 and 7, to a plaster-wall panel.

Referring to FIGS. 1 through 5, there is shown a plug A of an anchor assembly made according to the teaching of the invention. This plug A is formed of a forward section 3 made up of an elongated tapering board-piercing part 5 and of somewhat triangular ram head 7 at the base of, and integral with, the tapering part 5. The ram head 7 is preferably hollow and defines a ram surface 9 traversing the longitudinal axis 11 of the plug and being slightly inclined forwardly with respect to it, that is at an angle of about 10° with the vertical, as indicated in FIG. 5. To ease in driving the plug through a plaster-wall panel, the tapering section 3 should be as slender as possible such as having a lateral tapering angle of 5° with the longitudinal axis 11, as shown in FIG. 1. The vertical taper angle should likewise be small. The plug A further comprises a rearward section 13 essentially in the form of a hollow cylinder 15 coaxial with the plug longitudinal axis 11.

The forward section 3 of the plug comprises a first pair of flat elongated coplanar tapering fins 17, 19, disposed beneath the longitudinal axis 11 and parallel to it.

As can be noted from FIGS. 1 and 2, the fins 17, 19 straighten out as they reach the ram head 7 and, together, unite to form an integral extension 21 which merges with, and becomes an integral part of, the cylinder 15. FIGS. 2 and 5 show that the ram head 7 is detached from the extension 21 and has an undersurface 22 which lies above the said extension 21, so that the junction 23 between the fins 17, 19 and the extension 21 may act as an interconnecting means allowing pivotal movement of the plug forward section 3 with respect to the plug rearward section 13, as is further explained hereinbelow.

The plug forward section further comprises a second pair of flat elongated coplanar tapering fins 25, 27, between the fins 17, 19 perpendicular to them and respectively above and below them. The fin 27 preferably has a blunt forward edge 28. It will be noted from FIG. 3, that the fins 17, 19–25, 27 form the branches of an inverted cross.

It will also be noted from FIGS. 2 and 5, that the rearward end of the lower fin 27 terminates short of the pivot hinge 23 and its rearward edge 33 is forwardly inclined by an angle of about 30° with the vertical for a reason to be given hereinafter.

In the embodiment of the invention shown in FIGS. 1 to 5, 8 and 9, the two sections 3 and 13 of the plug A are releasably locked together in axial alignment, by a locking means consisting of a pair of commonly known pawl-and-rachet combinations 29 and 31 (FIG. 1) on the ram head 7 and on the plug cylindrical section 13. It will be noted that both combinations are located above the longitudinal axis 11, the junction 23 acting as a pivot hinge below the axis 11.

Figure 10:
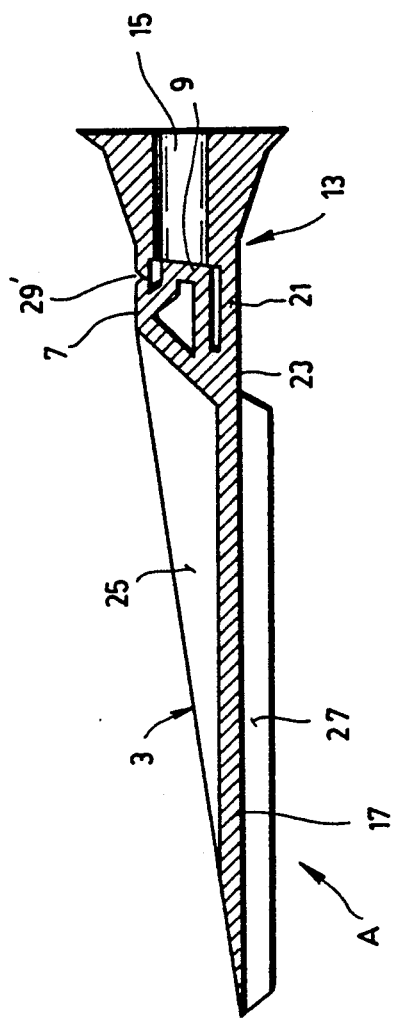
FIG. 10 is a view similar to that of FIG. 2, showing another plug according to the invention.

In the other embodiment of the invention shown in FIG. 10 where the same reference numerals have been used, the two sections 3 and 13 of the plug A are releasably locked together in axial alignment, by a small integral wall 29' bridging the upper part of the ram head 7 to the upper part of the plug cylindrical section 13, the bridging wall 29' being very thin to be easily torn out whenever a pressure is applied onto the ram surface 9.

The above described plug A may be used with any conventional screw capable of being inserted into the cylinder 15. In accordance with a preferred embodiment of the invention, it is however preferably used in combination with a spike B, shown in FIGS. 6 and 7, which can be hammer-driven into the cylindrical section 13 of the plug, as shown in FIGS. 8 and 9.

Figure 9:
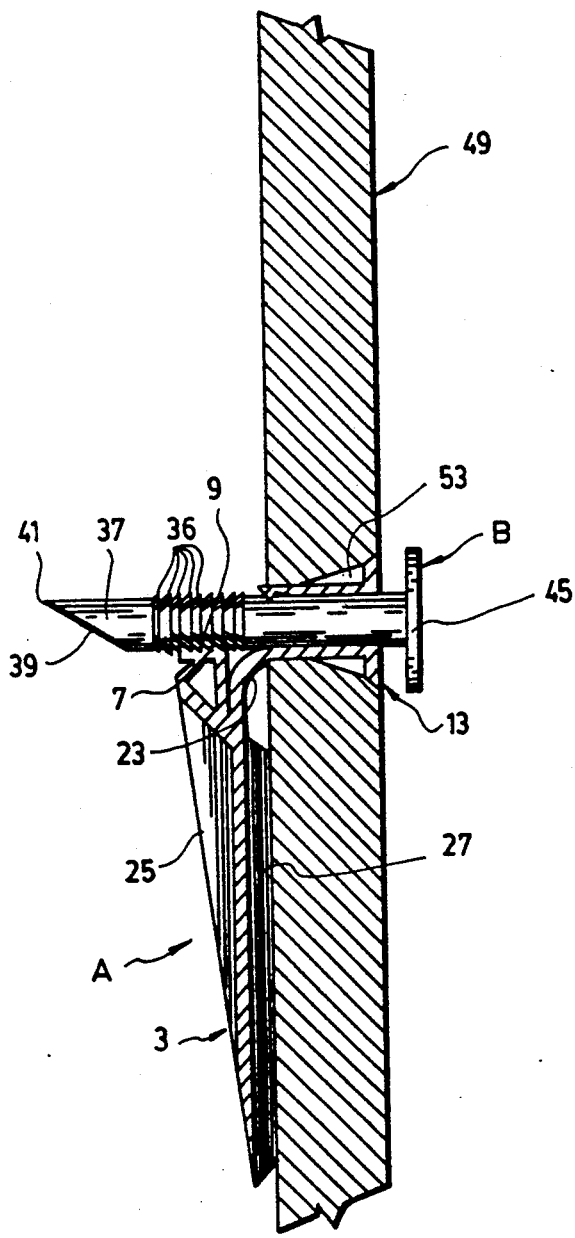
FIG. 9 is a view similar to that of FIG. 8, showing the same anchor assembly but fastened with another, longer spike.

The spike B has a cylindrical portion 35 of which the outer surface is formed with means such as parallel fish-hook serrations 36 suitable for bitting into the inner wall of the plug cylindrical section 13 so that the spike may be secured firmly to and become integral with the plug section 13, as easily gathered from FIG. 8. For this purpose, the spike B should be made of harder material than the plug A, metal and plastic material for instance. Forwardly of the spike serrated cylindrical portion 35 is a cylindrical hammer portion 37 having a bevel-edge 39 which is rearwardly strongly inclined toward the longitudinal axis 11 so that, as shown in FIG. 8, its sharp tip 41 may hit the ram surface 9 at its end which is as far away from the pivot hinge 23 as possible, thereby enhancing the leverage action of the spike hammer portion. In order to ensure that the sharp tip 41 remains constantly in that position relative to the pivot hinge 23, the spike sections 35, 37 are formed with guiding means in the form of an axial 90° triangular groove 57 (FIG. 7) intended to fit over an appropriately sized triangular 90° rib 59 (FIGS. 2, 4) projecting from the bore surface of the plug cylinder 15.

As shown in FIGS. 6 and 8, the rearward end of the spike B may be formed with a wall abutment ring flange 43 followed by a parallel hammer ring 45 connected to the flange 43 by a stub pin 47. Alternatively, as is shown in FIG. 9, the rearward end of the spike B may be formed only with a hammer ring 45. In bothe cases this construction serves, in known manner, to hang objects from the wall board 49.

In use, the plug A is first hammered through the plaster-wall panel 49 (FIGS. 5, 8) from its visible face 50, the cylinder 15 of the plug A and the fin extension 21 having a combined length sufficient to place the pivot axis of the hinge 23 just behind the plane of the concealed face 51 of the panel, when the plug A is fully inserted, as best seen in FIG. 5. To ascertain proper insertion of the plug in the plaster of the board 49, triangular ribs 53 may be provided around the outer surface of the cylinder 15, projecting forwardly from a radial strengthening beveled flange 55.

After the sharp tip 41 of the hammer portion 37 has reached the ram surface 9, further hammering in of the spike B causes simultaneous release or breakage of the pawl-and-ratchet locks 29, 31 or of the bridging wall 29' (FIG. 10), and pivotal movement of the plug forward section 3 about the axis of the hinge 23 which is transverse to the longitudinal axis 11.

In the embodiment shown in FIG. 8 where a spike B short in length is used, the sharp tip 41 of the hammer portion moves from the ram surface 9 to the undersurface 22.

In that situation, the fish-hook serrations 36 on the circumference of the cylindrical portion 35 of the spike (FIG. 6) bite into the internal wall of the plug cylinder 15 and prevent withdrawal of the spike B unless the plug A is removed. However, this is also prevented by the position of the pivoted section 3 against the wall 51, the section 3 being locked in that pivoted position by the hammer portion 37 being applied against the undersurface 22.

In the embodiment shown in FIG. 9 where a longer spike B is used, the length of the portion 37 of the spike B causes the forward section 3 of the plug A not only to pivot about the hinge 23, but also to move down and cause firm abutment of the lower fin 27 against the concealed face 51 of the plaster board 49. Firm abutment of the rib 27 is helped by having it terminate short of the hinge 23 and by having its end face 33 forwardly inclined (FIG. 5), as aforesaid.

In that situation, the fish-hook serrations 36 on the circumference of the cylindrical portion 35 of the spike B bite into the ram surface 9 and prevent withdrawal of the spike unless the plug is removed. Such is however prevented because of the position of the section 13.

In both cases the length of the pivoted section 3 may be selected to spread any load carried by the hook pin 47 over a surface area of the plaster-wall panel 49 sufficient to withstand it.

What is claimed is:

1. A plug for a wall anchor assembly for use on a plaster-wall board of predetermined thickness, said plug having a longitudinal axis and comprising:
   a) a forward section for driving through a plaster-wall board, said forward section having an elongated tapering board-piercing part and ram head at the base of and integral with said tapering part, said ram head defining a ram surface transverse to said longitudinal axis;
b) a rearward section provided rearwardly of said ram head and coaxial with said longitudinal axis said rearward section being hollow and cylindrical;
c) means, on one side of said longitudinal axis, for interconnecting said sections for allowing relative pivotal movement therebetween about an axis normal to said longitudinal axis;
d) means, on the other side of said longitudinal axis, for releasably locking said sections together in axial alignment;
e) a pair of first flat elongated coplanar tapering fins in said tapering part, said fins being disposed on said one side of said longitudinal axis and being parallel to said longitudinal axis; and
f) a coplanar straight extension of said fins, integrally joining said plug cylindrical section to define said first means allowing said pivotal movement between said forward and rearward sections.

2. A plug as claimed in claim 1, wherein said forward section further comprises a pair of second flat elongated coplanar tapering fins perpendicular to said first fins and on either side thereof.

3. A plug as claimed in claim 1, wherein said means for releasably locking said sections together are a pawl-and-ratchet combination on said ram head and on said rearward cylindrical section.

4. A plug as claimed in claim 1, wherein said means for releasably locking said sections together comprises a small integral wall bridging said ram head to said rearward cylindrical section, said small wall being thin enough to be easy to tear out whenever a pressure is applied onto the ram head.

5. A plug for a wall anchor assembly for use on a plaster-wall board of predetermined thickness, said plug having a longitudinal axis and comprising:
a) a forward section for driving through a plaster-wall board, said forward section having an elongated tapering board-piercing part and ram head at the base of and integral with said tapering part, said ram head defining a ram surface transverse to said longitudinal axis;
b) a rearward section provided rearwardly of said ram head and coaxial with said longitudinal axis, said rearward section being hollow and cylindrical;
c) means, on one side of said longitudinal axis, for interconnecting said sections for allowing relative pivotal movement therebetween about an axis normal to said longitudinal axis;
d) means, on the other side of said longitudinal axis, for releasably locking said sections together in axial alignment;
wherein said means for releasably locking said sections together are a pawl-and-ratchet combination on said ram head and on said rearward cylindrical section.

6. A plug for a wall anchor assembly for use on a plaster-wall board of predetermined thickness, said plug having a longitudinal axis and comprising:
a) a forward section for driving through a plaster-wall board, said forward section having an elongated tapering board-piercing part and ram head at the base of and integral with said tapering part, said ram head defining a ram surface transverse to said longitudinal axis;
b) a rearward section provided rearwardly of said ram head and coaxial with said longitudinal axis, said rearward section being hollow and cylindrical;
c) means, on one side of said longitudinal axis, for interconnecting said sections for allowing relative pivotal movement therebetween about an axis normal to said longitudinal axis;
d) means, on the other side of said longitudinal axis, for releasably locking said sections together in axial alignment;
wherein said means for releasably locking said sections together comprises a small integral wall bridging said ram head to said rearward cylindrical section, said small wall being thin enough to be easy to tear out whenever a pressure is applied on to the ram head.

7. A plug for a wall anchor assembly for use on a plaster-wall board of predetermined thickness, said plug having a longitudinal axis and comprising:
a) a forward section for driving through a plaster-wall board, said forward section having an elongated tapering board-piercing part and ram head at the base of and integral with said tapering part, said ram head defining a ram surface transverse to said longitudinal axis;
b) a rearward section provided rearwardly of said ram head and coaxial with said longitudinal axis, said rearward section being hollow and cylindrical;
c) means, on one side of said longitudinal axis, for interconnecting said sections for allowing relative pivotal movement therebetween about an axis normal to said longitudinal axis;
d) means, on the other side of said longitudinal axis, for releasably locking said sections together in axial alignment; and
wherein said hollow cylindrical rearward section and said interconnecting means have a combined length sufficient to cover the full thickness of the board, said pivotal movement about said longitudinal axis occurring outside of the board after the plug has been fully inserted therein.

8. An anchor assembly comprising a plug having a longitudinal axis and including:
a) a forward section for driving through a plaster-wall board, said forward section having an elongated tapering board-piercing part and ram head at the base of and integral with said tapering part, said ram head defining a ram surface transverse to said longitudinal axis;
b) a rearward section provided rearwardly of said ram head and coaxial with said longitudinal axis, said rearward section being hollow and cylindrical;
c) means, on one side of said longitudinal axis, for interconnecting said sections for allowing relative pivotal movement therebetween about an axis normal to said longitudinal axis;
d) means, on the other side of said longitudinal axis, for releasably locking said sections together in axial alignment;
e) a spike for driving into said plug cylindrical section, said spike having:
a cylindrical portion with means on the outer surface thereof suitable for biting into said rearward cylindrical section or said ram head whereby to secure said spike portion to said plug cylindrical section, when driven thereinto; and
a hammer portion forwardly of and integral with said cylindrical portion; said hammer portion having a length sufficient, as said spike is driven into said plug cylindrical section, first to engage said ram head surface and then successively to cause release of said locking means and pivotal movement of said plug forward section.

9. An assembly as claimed in claim 8, wherein said spike hammer portion has bevel-edge defining a sharp tip, the assembly further comprising means for guiding said spike in said plug cylindrical section to force engagement of said tip with said ram surface on said one side of said longitudinal axis.

10. An assembly as claimed in claim 9, wherein said guiding means comprise a triangular groove-and-rib combination extending axially of said plug cylindrical section and of said spike cylindrical portion.

11. An assembly as claimed in claim 9, wherein said ram surface is slightly inclined in the direction of said one side of said longitudinal axis and in the direction of said plug tapering part.

12. An assembly as claimed in claim 8, wherein said means for releasably locking said section of said plug are a pawl-and-ratchet combination on said ram head and on said plug cylindrical section.

13. An assembly as claimed in claim 12, wherein said plug includes:
- a pair of first flat elongated coplanar tapering fins in said tapering part, said fins being disposed on said one side of said longitudinal axis and being parallel to said longitudinal axis; and
- a coplanar straight extension of said fins, integrally joining said plug cylindrical section to define said first means allowing said pivotal movement between said plug forward and rearward sections.

14. An assembly as claimed in claim 12, wherein said spike hammer portion has a bevel-edge defining a sharp tip, the assembly further comprising means guiding said spike in said plug cylindrical section to force engagement of said tip with said ram surface on said one side of said longitudinal axis.

15. An assembly as claimed in claim 14, wherein said guiding means comprise a triangular groove-and-rib combination extending axially of said plug cylindrical section and of said spike cylindrical portion.

16. An assembly as claimed in claim 8, for use on a plaster-wall board of predetermined thickness and wherein said plug cylindrical section and said interconnecting first means have a combined length sufficient to cover the full thickness of the board whereby to allow said pivotal movement about said longitudinal axis.

17. An assembly as claimed in claim 16, wherein said spike hammer portion has a bevel-edge defining a sharp tip, the assembly further comprising means guiding said spike in said plug cylindrical section to force engagement of said tip with said ram surface on said one side of said longitudinal axis.

18. An assembly as claimed in claim 17, wherein said plug includes:
- a pair of first flat elongated coplanar tapering fins in said tapering part, said fins being disposed on said one side of said longitudinal axis and being parallel to said longitudinal axis; and
- a coplanar straight extension of said fins, integrally joining said plug cylindrical section to define said first means allowing said pivotal movement between said plug forward and rearward sections.

19. An assembly as claimed in claim 18, wherein said means for releasably locking said forward and rearward sections are a pawl-and-ratchet combination on said ram head and on said rearward cylindrical section.

20. An assembly as claimed in claim 16, wherein said spike is made of a material harder than said plug and has a bevel-edge rearwardly inclined toward said longitudinal axis, said bevel-edge defining a sharp tip capable of hitting said ram surface at the end thereof away from said pivot first means.

* * * * *